United States Patent
Illig et al.

[11] Patent Number: 6,076,642
[45] Date of Patent: Jun. 20, 2000

[54] BRIDGE COUPLING IN A TORQUE CONVERTER

[75] Inventors: Roland Illig, Heustreu; Frank Thorn, Schweinfurt; Robert Besendorf, Oerlenbach; Maximilian Henze, Bergrheinfeld; Bernd Schöder, Münnerstadt; Klaus Seemann, Mühlhausen, all of Germany

[73] Assignee: Mannesmann Sachs AG, Schweinfurt, Germany

[21] Appl. No.: 09/277,055

[22] Filed: Mar. 26, 1999

[30] Foreign Application Priority Data

Mar. 26, 1998 [DE] Germany ............... 198 13 298
Apr. 11, 1998 [DE] Germany ............... 198 16 397

[51] Int. Cl.[7] .................................................... F16H 45/02
[52] U.S. Cl. ................... 192/3.29; 192/200; 192/109 R
[58] Field of Search ................... 192/3.28, 3.29, 192/3.3, 200, 109 R, 110 B; 464/162, 169

[56] References Cited

U.S. PATENT DOCUMENTS 4,986,398  1/1991  Olsen .......................... 192/3.28
5,575,363  11/1996 Dehrmann et al. .
5,667,043  9/1997  Dehrmann et al. ............ 192/3.29

FOREIGN PATENT DOCUMENTS 2 380 469     9/1978  France .
44 23 640 A1  6/1995  Germany .
44 24 989     1/1996  Germany .

*Primary Examiner*—Richard M. Lorence
*Attorney, Agent, or Firm*—Cohen, Pontani, Lieberman & Pavane

[57] ABSTRACT

A bridge coupling on a hydrodynamic torque converter is embodied with an axially movable piston arranged on a radial bearing. In one operating position, the piston can be brought into active connection with a support surface of a radial flange of the converter housing via at least one friction lining. The piston executes its axial movement under the influence of an axially elastic element integrated in the radial bearing and having an elastomer substantially deformable in the axial direction.

19 Claims, 5 Drawing Sheets

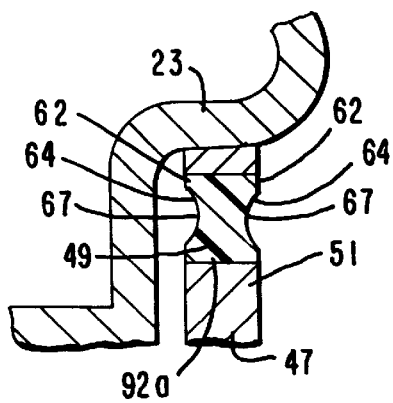
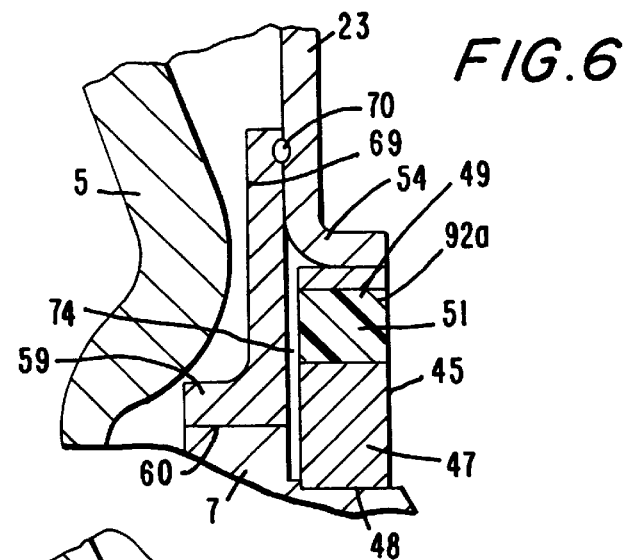
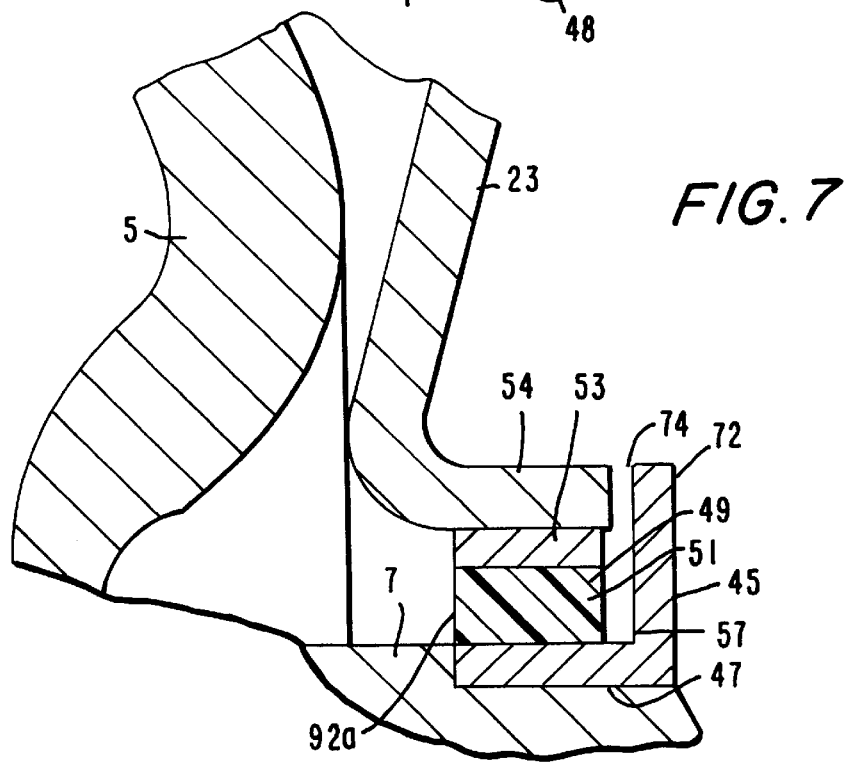

BRIDGE COUPLING IN A TORQUE CONVERTER

BACKGROUND OF THE INVENTION

1. Field of the Invention

The invention relates to torque converters and more particularly to a bridge coupling in a hydrodynamic torque converter.

2. Description of the Related Art

DE 44 23 640 A1 discloses a bridge coupling on a hydrodynamic torque converter that comprises a piston arranged in an axially movable fashion on a housing hub that serves as a radial bearing. The piston can be moved in the usual manner between one operating position, wherein the piston is actively connected via friction linings to the support surface of a drive-side radial flange of the converter housing, and a second operating position, wherein the piston releases the friction linings. The piston is connected to a star wheel attached to the housing hub via axially elastic elements, which consist of a plurality of tangential leaf springs secured along the circumference. The tangential leaf springs allow the aforementioned axial movement of the piston, but prevent a rotary movement of the piston relative to the star wheel. The springs can be prestressed so as to either stress the piston in the direction of the drive-side radial flange of the converter housing or draw the piston toward a turbine wheel of the torque converter.

The aforementioned star wheel, which holds the tangential leaf springs, is usually calked to the housing hub and has a tooth system, as does the housing hub itself, to protect against rotation relative thereto. As a result, both the housing hub and the star wheel are relatively complicated.

The tangential leaf springs are connected at one end to the star wheel and at the other end to the piston. These connections are established by riveting. The two connection points, on the one hand, and the tangential leaf springs, on the other, result in the addition of tolerances, so that a broad tolerance band is created. It is also problematic that a radial offset can result from the riveting of the tangential leaf springs to the piston and the star wheel. As a result, on one side of the housing hub, the piston compresses a seal in the housing hub (FIG. 1) such that steel runs on steel, while, on the opposite radial side, a clearance remains that permits the passage of hydraulic fluid.

The prestressing of the tangential leaf springs creates a further problem: In modern vehicles with markedly low idle speeds, the hydropump that supplies the converter circuit with hydraulic fluid, cannot build up sufficient pressure to overcome the force of the tangential leaf springs and to elevate the piston completely from the friction linings upon detachment of the bridge coupling. As a result, the engine can stall. This problem occurs particularly in the case of elbowed tangential leaf springs. In addition, such leaf springs have the disadvantage, due to their axial connection between the piston and the carrier star, of requiring a large axial structural space. Moreover, in order to advantageously accommodate the tangential leaf springs, both the piston and the carrier star must be embodied flatly in the radial extension regions that hold the springs, as a result of which the piston loses rigidity compared with a convex embodiment.

SUMMARY OF THE INVENTION

It is therefore an object of the invention to connect a piston to a converter housing such that the piston, with extremely compact axial design and high deformation rigidity, is simply mounted and can be moved back and forth between its possible positions without any substantial manifestation of tolerance problems.

This and other objects are achieved accordingly to an embodiment of the invention where an axially elastic element is integrated into the radial bearing of the piston.

The integration of the axially elastic element into the radial bearing of the piston, and the embodiment of this element by a torque transmission element that is deformable substantially in the axial direction, but dimensionally stable in the circumferential direction—such as an elastomer, a spring steel disk, or an elastomer and a spring steel disk in parallel arrangement—creates a very simple embodiment in which a bearing ring of the radial bearing is preferably attached to a housing hub of the torque converter and carries the torque transmission element via the piston. When an elastomer serves as the torque transmission element, the elastomer advantageously radially carries a cover ring between itself and the piston. The cover ring serves, firstly, to protect the elastomer, and secondly, to allow the radial bearing, which comprises the bearing ring, the elastomer and the cover ring, to be produced even without the piston having been put in place (care must then be taken that the cover ring radially surrounds the bearing ring evenly, so that no eccentricity is introduced into the radial bearing). Then, the piston can simply be pressed on this low-imbalance radial bearing in a production process. Thus, no tolerance additions need be anticipated in the axial direction or with respect to the friction surface relative to the friction linings.

The torque transmission element is preferably installed with a slight axial prestress directed toward the turbine wheel, so that even under the low operating pressures of the hydropump in idle operation in a vehicle running at low speed, the piston cannot drag on the friction linings of the bridge coupling. Advantageously, the torque transmission element is installed in the radial bearing such that when the bridge coupling is detached, the torque transmission element is either undeformed or has only a slight deformation that forms a rhomboidal cross-section. The deformation can result from the fact that, due to an overpressure in a chamber located axially between the piston and the drive-side radial flange of the converter housing, an overpressure builds up relative to the converter circuit, and the piston is therefore deflected in the direction of the turbine wheel. When the piston interacts with an axial stop advantageously provided on the radial bearing, and when this axial stop is arranged with a predetermined clearance relative to the piston when the latter is in the neutral position (in which the torque transmission element is deformation-free), the piston, due to the overpressure in the aforementioned chamber, is pressed past this neutral position toward the turbine wheel. The piston thereby deforms the torque transmission element in the manner described above, until coming to rest on the axial stop. Conversely, a pressure relief in the chamber located axially between the piston and the drive-side radial flange results in an overpressure in the converter circuit, which presses the piston toward the radial flange of the converter housing and thus ensures a friction-locking connection of the piston to the converter housing. In this position, in which torque is transmitted from the converter housing to the piston in a known manner, the torque transmission element is deformed in the opposite direction, whereupon a rhomboidal cross-section is again advantageously formed.

The deformation behavior of the torque transmission element can be heavily influenced by the choice of material for this element, as well as by its geometric design. A profiling in the form of an outwardly-directed bulge of the axial sides increases the rigidity of the torque transmission element in the axial direction. On the other hand, a contraction of the axial sides decreases the rigidity. On the whole, axial flexibility of the torque transmission element is desirable for the axial adjustment movement of the piston, but the torque transmission element should nonetheless be sufficiently rigid in the circumferential direction to accommodate the piston in a rotation-proof manner. Such a torque transmission element will exert a damping effect, even in the circumferential direction, that advantageously acts on torsional vibrations induced with the torque. Rattling, as can occur in the case of conventional torque converters, especially when the bridge coupling is open and particularly in areas of a toothed connection between the piston and the converter housing, is prevented in the radial bearing according to the invention by the torque transmission element. The torque transmission element also axially seals the pressure spaces on both sides of the piston, so that no additional seal is needed.

In the purely radial arrangement of the bearing ring, torque transmission element and cover ring at the radial bearing (described above), the bearing ring performs the function of the aforementioned axial stop for the piston. Moreover, the piston, which is pressed on the cover ring, is embodied with an inwardly-directed radial extension that can run, preferably via the predetermined axial clearance, toward a corresponding axial stopping face of the bearing ring. The radial extension of the piston is preferably embodied so as to have an axial shoulder, with which the radial extension is held in axially movable fashion on a radial support embodied, preferably, on the housing hub. Such an embodiment of the piston provides strong profiling of the piston in the axial direction, and thus high rigidity. However, if a more compact design of the radial bearing is preferred, especially in the radial direction, it is possible to embody the bearing ring with a radial leg running substantially vertical to the bearing ring, which acts in the axial direction as an axial stop for the piston. Preferably, the piston, in its neutral position (i.e., when the torque transmission element is undeformed), has an axial gap relative to the radial leg, so that, when the bridge coupling is detached, a slight overstretch of the torque transmission element counter to its actual deformation direction is permitted.

If no elastomer is to be used on the cover ring in embodying the torque transmission element, and the piston is nonetheless to be simply mounted on the radial bearing, embodiments in which the piston has a tooth system that engages into a tooth system on the bearing ring are advantageous. This toothed engagement can be such that the individual tooth systems are substantially vertical to each other. However, for the sake of lower area pressure, the two tooth systems can also be parallel to each other at least over a partial segment of the toothed engagement. A final connection of the piston to the bearing ring is created by connecting an elastomer, which extends in the radial direction via the toothed engagement, to the piston on the one hand, and to the bearing ring on the other, preferably by means of vulcanization. This elastomer is especially axially elastic when it is embodied radially between the two vulcanization points with an axial recess.

For the transmission of high torques, an elastomer can be too flexible in the circumferential direction, especially when this elastomer is highly elastic in the axial direction. For this reason, according to another embodiment of the invention, it is possible for the elastomer to be associated with a spring steel disk that is elastic in the axial direction but rigid in the circumferential direction. Like the elastomer, the spring steel disk is connected in rotation-proof fashion to both the cover ring of the radial bearing and to the bearing ring. The elastomer and the spring steel disk together form the torque transmission element according to the invention. While the elastomer is preferably connected to these elements by means of vulcanization, the spring steel disk can be attached, for example, by riveting, adhesion, welding, flanging or clamping. Due to its high circumferential rigidity, the spring steel disk substantially absorbs the moments acting in the circumferential direction. At the same time, its axial rigidity supplements that of the elastomer, so that the total rigidity in the axial direction results from the parallel connection of the elastomer and the spring steel disk. In this case, the elastomer can therefore have lower axial rigidity than in embodiments without the spring steel disk, meaning that clear material savings are possible on the elastomer, which continues to simultaneously perform a sealing function.

When the elastomer is completely omitted, the torque transmission element can consist of a spring steel disk alone. Of course, in this case, due to the absence of the elastomer, the spring steel disk is embodied relatively rigidly in the axial direction, and at the same time, it must also perform the sealing function that otherwise would have been the responsibility of the elastomer. An excellent sealing function is achieved, in particular, when the spring steel disk, after being encompassed, is both surrounded and gripped behind by the cover ring and the bearing ring of the radial bearing. The solution that omits the elastomer is especially advantageous when it is feared that the converter fluid, due to its specific material properties as well as to the high temperature prevailing during converter operation, would negatively impact the useful life of the elastomer.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings wherein like reference numerals denote similar components throughout the view:

FIG. 5 is a detailed view corresponding to FIG. 4 with an elastomer with contractions on its axial sides;

FIG. 6 is a detailed view of another embodiment of the bridge coupling according to the invention;

FIG. 7 is a detailed view corresponding to FIG. 6 showing another embodiment of a radial bearing according to the invention;

DETAILED DESCRIPTION OF PREFERRED EMBODIMENTS

Figure 1:
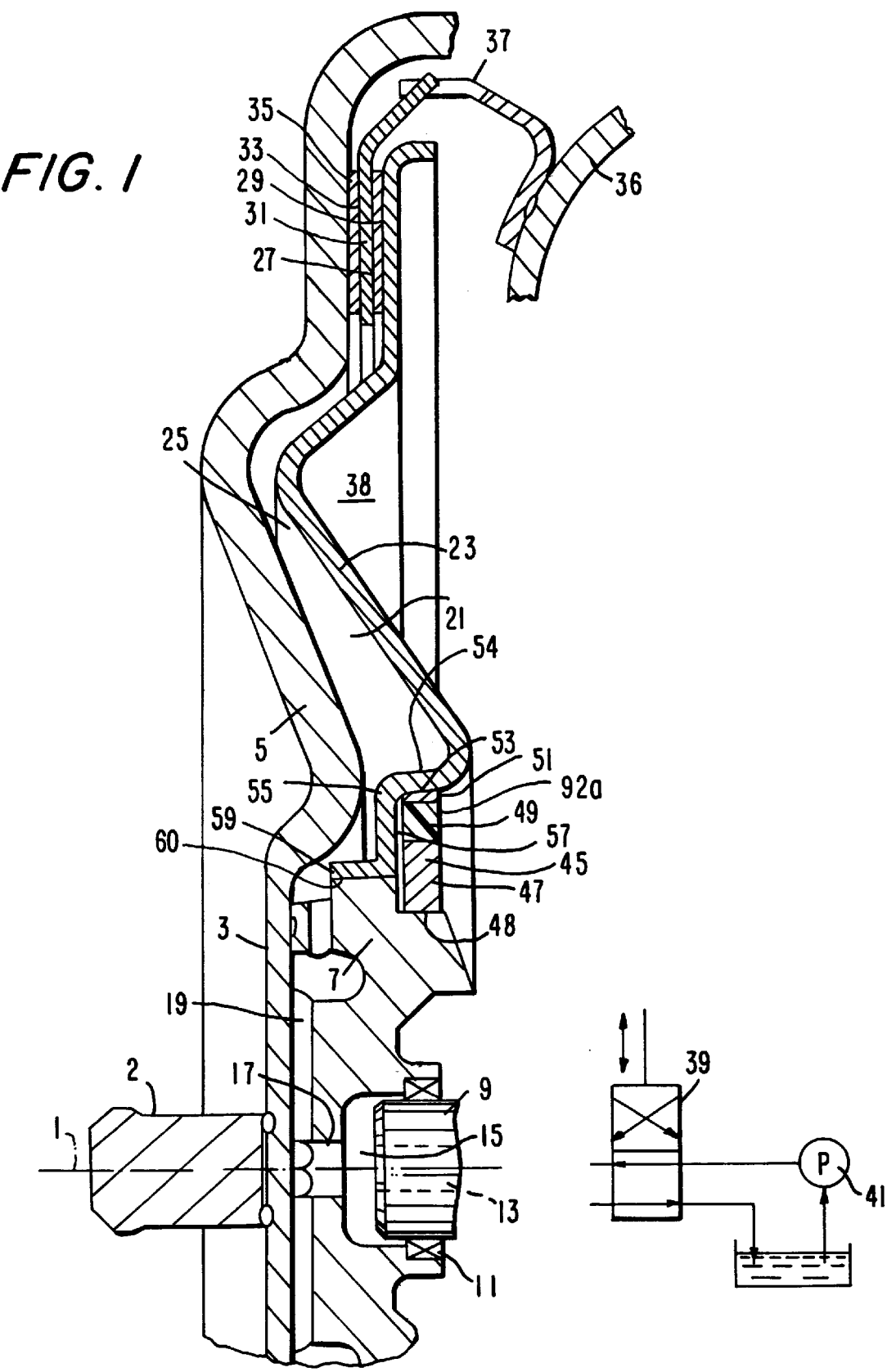
FIG. 1 is a sectional view of the upper half of a hydrodynamic torque converter showing a bridge coupling area with a radial bearing (with an elastomer) for a piston, according to an embodiment of the present invention.

FIG. 1 shows the area of a hydrodynamic torque converter in which friction linings are provided for transmitting a torque from the converter housing, as well as from a piston of the bridge coupling, to an output shaft. The torque converter as a whole is not shown or described, because such torque converters are known from the prior art, e.g., from DE 44 23 640 A1.

The depicted hydrodynamic torque converter is rotatable around a central axis 1. A bearing journal 2, which is usually rotatably held in a recess of a crank shaft of a drive, e.g., an internal combustion engine, is connected in a single piece to a radial flange 5 of a converter housing 3, while a housing hub 7 is attached to the radially inner area of the radial flange 5. The housing hub 7 serves for mounting an output shaft 9, which is usually a transmission shaft, and which is held via a seal 11 in the housing hub 7. The output shaft 9 has a central boring 13, which opens at the end of the output shaft 9 facing the housing hub 7 into a space 15, which in turn opens via an axial passage 17 into channels 19 running radially outward. The channels 19 lead into a chamber 21, which is axially located between the radial flange 5 and a piston 23 of a bridge coupling 25. Axially arranged between the piston 23 and the primary flange 5 is a lamella 31, which carries on its two axial sides the respective friction linings 33, 35. The friction lining 33 that faces the radial flange 5 can be brought into active connection with a friction surface 29 on the piston 23. The lamella 31 is attached in rotation-proof fashion via a bow-shaped carrier 37 to the turbine wheel 36, which, together with a pump wheel and a guide wheel (both of which are embodied in a known manner and therefore not depicted), forms the hydrodynamic torque circuit 38. This circuit 38, like the chamber 21, can be pressurized with hydraulic fluid in keeping with the operating state of a switching valve 39, whereby the hydraulic fluid is conveyed via a hydropump 41 after being taken from a hydraulic supply reservoir 43.

The piston 23 is placed on a radial bearing 45, which has radially layered one atop the other, a bearing ring 47, an axially elastic element 49 in the form of an elastomer 51 which acts as the torque transmission element 92a, and a cover ring 53. Tile bearing ring 47 is secured to a bearing surface 48 of the housing hub 7 and carries the elastomer 51, which is preferably attached to the bearing ring 47 by vulcanization. The cover ring 53 is also attached to the elastomer 51 by vulcanization. The piston 23 is pressed onto the cover ring 53 and thus connected in force-locking fashion to the radial bearing 45. Radially inside of the pressing area 54 of the piston 23, the latter has a radial extension 55, which, at its radially inner end, has an axial shoulder 59, that comes to rest on a radial support 60 of the housing hub 7. The radial extension 55 can be embodied in a single piece with the rest of the piston 23, as in FIGS. 1 through 5. However, as in FIG. 6, the radial extension 55 can also be embodied by a bracket 69, which is attached via a welded seam 70 to the piston 23. There are no functional differences between these two embodiments, only differences related to production.

Figure 2:
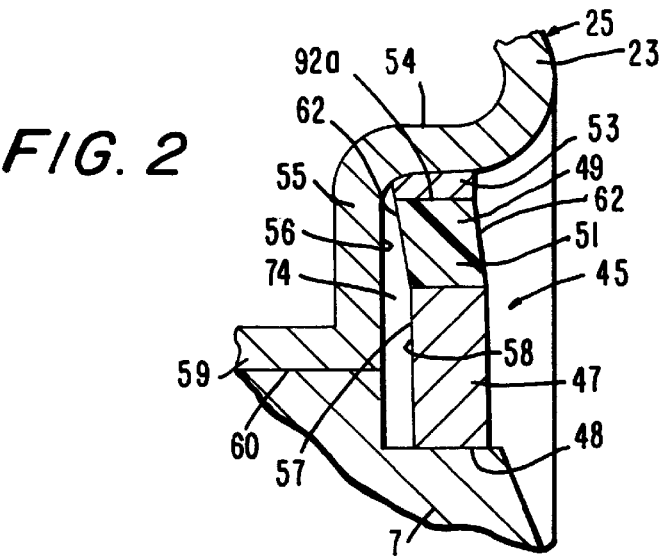
FIG. 2 is a detailed view of the bridge coupling area related to the radial bearing, at the closest axial approach of the piston to a drive-side radial flange of the converter housing.
Figure 3:
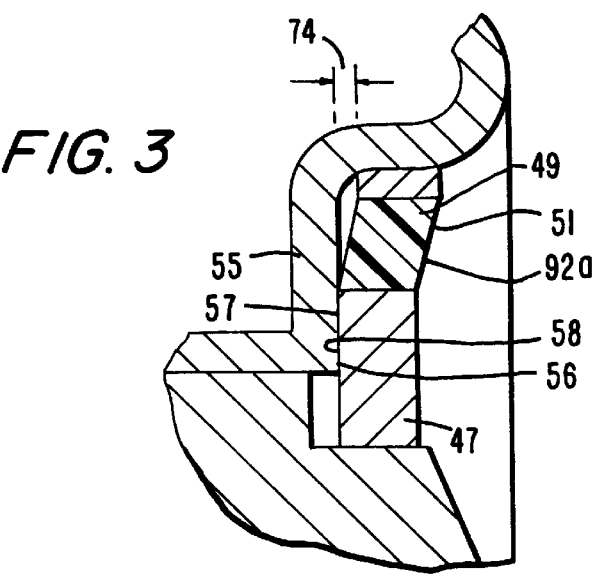
FIG. 3 is a detailed view corresponding to FIG. 2 with the piston in the opposite axial end position.

The function of the radial bearing 45 is explained below specifically in reference to FIGS. 1 through 3. To close the bridge coupling 25 for the purpose of transmitting torque from the converter housing 3 via the friction linings 33, 35 to the piston 23, the converter circuit 38 is pressurized with an overpressure relative to the chamber 21. Due to this overpressure, the piston 23 is moved toward the radial flange 5. The elastomer 51 follows this movement of the piston 23 by deformation, as shown in FIG. 2. Conversely, the application of an overpressure in the chamber 21 relative to the converter circuit 38 causes the piston 23 to move back away from the radial flange 5. The piston 23 thereby passes its neutral position (FIG. 1), in which the elastomer is undeformed, and does not come axially to a stop until coming to rest, as in FIG. 3, with the axial side 56 of its radial extension 55 that faces the radial bearing 45, on the corresponding axial stopping face 58 of the bearing ring 47, which thus acts as the axial stop for the piston 23. In this position, the elastomer 51 as shown in FIG. 3 is deformed counter to its deflection direction in FIG. 2.

This deformation position of the elastomer 51 is favored by the fact that the elastomer 51 has a slight prestress toward the turbine wheel 36. This measure, along with the axial gap 74 shown in FIGS. 2 and 3, ensures that when the bridge coupling 25 is open, the piston 23 is held in a position wherein no dragging contact can occur with the associated friction lining 35. Losses in power when the bridge coupling 25 is open are correspondingly low.

Figure 4:
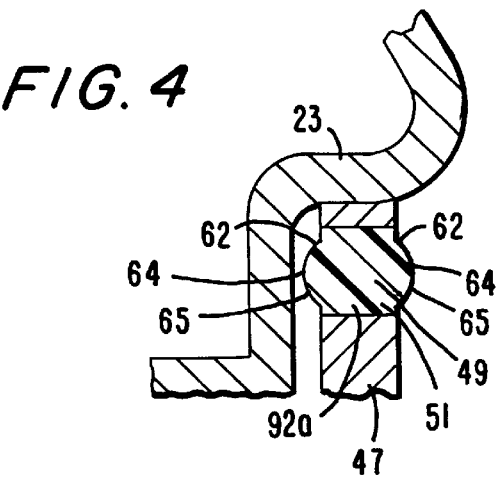
FIG. 4 is a detailed view corresponding to FIG. 2 showing an elastomer with bulges on its axial sides.

As explained above, the axial elasticity of the elastomer 51 can be influenced not only by the choice of material, but also by geometric design. Reference is hereby made to FIGS. 4 and 5, in which the elastomer 51 has a profiling 64 on both axial sides 62. The profiling 64 can be formed, as in FIG. 4, by the bulge 65, as a result of which the rigidity of the elastomer 51 is increased in the axial direction. However, a contraction 67 is equally conceivable, which results in a reduction in the rigidity of the elastomer 51 in the axial direction. Other geometric embodiments are also conceivable.

FIG. 7 shows an embodiment of a radial bearing 45 that is more compact in the axial direction. On the side of the bearing ring 47 that faces away from the radial flange 5, there is a radial leg 72, which extends substantially vertically relative to the bearing ring 47. Located axially between this leg 72 and the pressing area 54 of the piston 23 is the axial gap 74, which, like the gap 74 described in reference to FIGS. 2 and 3, makes it possible for the piston 23 to overstretch the elastomer 51 (FIG. 3) in the direction of the turbine wheel 36. This guarantees the separation of the piston 23 from the associated friction lining 35. Thus, the radial leg 72 acts as the axial stop 57 for the piston 23.

Figure 8:
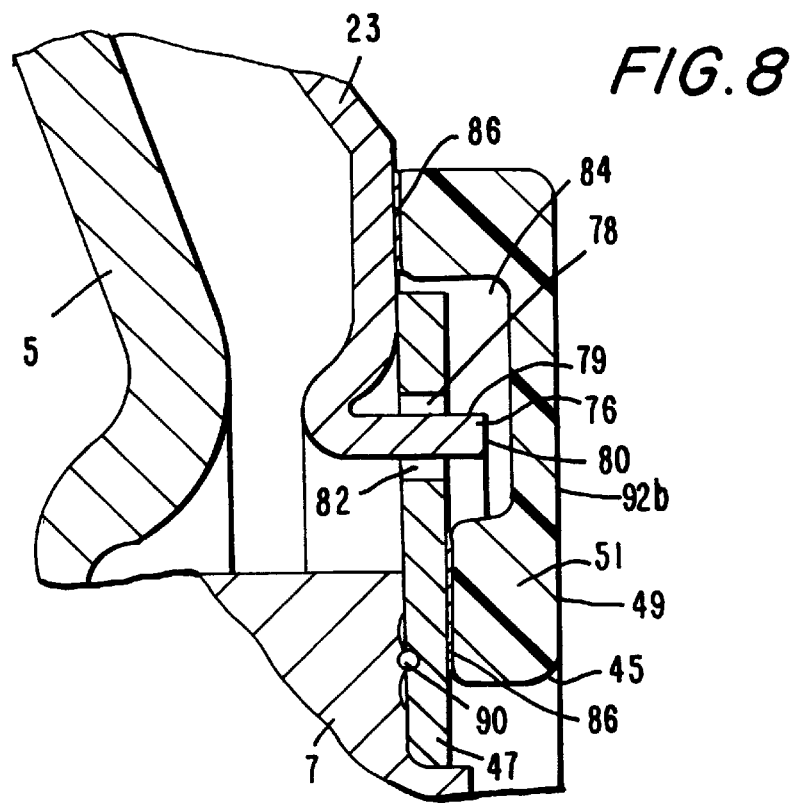
FIG. 8 is a detailed view of yet another embodiment of a bridge coupling according to the present invention.

A completely different embodiment of the radial bearing 45 is shown in FIG. 8, in which the piston 23 has, on the radially inner end, a tooth system 76, 78 which extends substantially in the axial direction and engages into corresponding depressions 82 of a disk-like bearing ring 47 in an axially movable but circumferentially fixed fashion. The depression 82 in the bearing ring 47 acts as the tooth system 76, 78. As a result, a toothed engagement 79 is created between the piston 23 and the bearing ring 47. A final connection of the two aforementioned piston 23 and bearing ring 47 is ensured by the elastomer 51, which is securely connected to the bearing ring 47 radially inside of the toothed engagement 79 and to the piston 23 radially outside of the toothed engagement 79, preferably by vulcanization at vulcanization points 86. The elastomer 51, acting as torque transmission element 92b, radially overlaps the toothed engagement 79, and thereby has available an axial recess 84. On the one hand, the axial recess 84 can influence the rigidity of the elastomer 51 in the axial direction; on the other hand, the recess 84 creates axial space for the toothed engagement 79. The function corresponds to that of the embodiment described above, and thus will not be discussed again here. It should only be noted that the disk-like bearing ring 47 is axially attached to the housing hub 7 via an attachment means 90 in the form of a welded seam.

Figure 9:
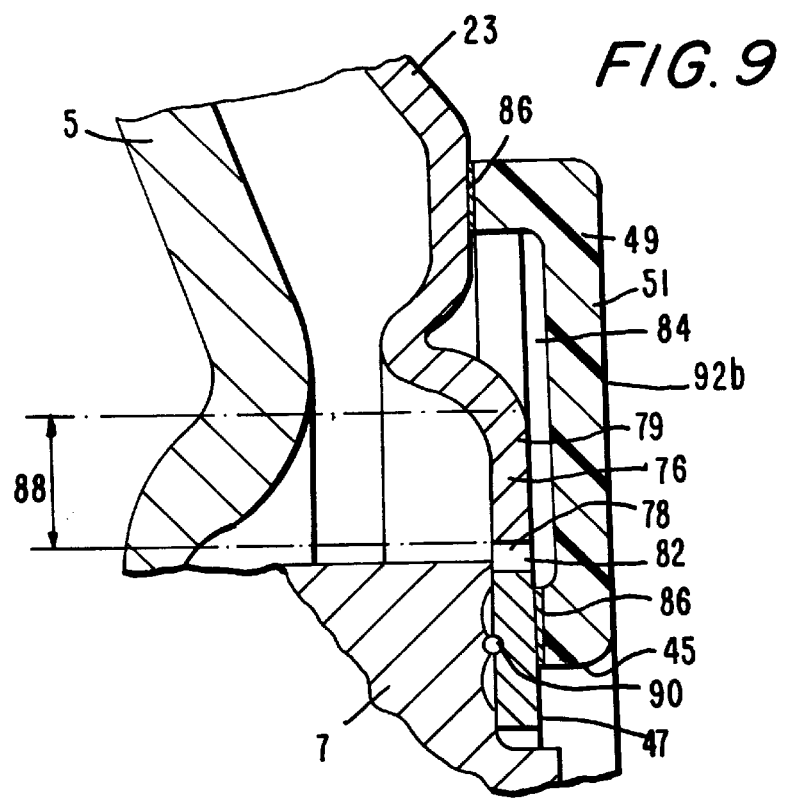
FIG. 9 is a modified embodiment of the bridge coupling of FIG. 8 according to the invention.

In the case of the toothed engagement 79 in FIG. 8, the contact area between the tooth systems 76, 78 is relatively small, because the two tooth systems extend at a right angle to each other. Thus, high area pressures and high component stresses can occur. To reduce such component stresses, the tooth system 76 on the piston 23 is embodied in its radially inner area so as to run substantially in the radial direction, as shown in FIG. 9, and thus to be directed, along a partial section 88 of the toothed engagement 79, parallel to the tooth system 78 on the disk-like bearing ring 47. As a result, a toothed engagement 79 is established over the entire length of the partial section 88, so that the area available for the transmission of torques is relatively large. In this embodiment, the elastomer 51, as described earlier in reference to FIG. 8, is again connected via vulcanization points 86 both to the piston 23 and to the bearing ring 47. As FIG. 9 shows, a recess 84 that is larger in the radial direction is provided in the elastomer 51 to hold the radially larger toothed engagement 79. As a result, the rigidity of the elastomer in the embodiment in FIG. 9 can be lower in the axial direction than that of the elastomer in FIG. 8.

Figure 10:
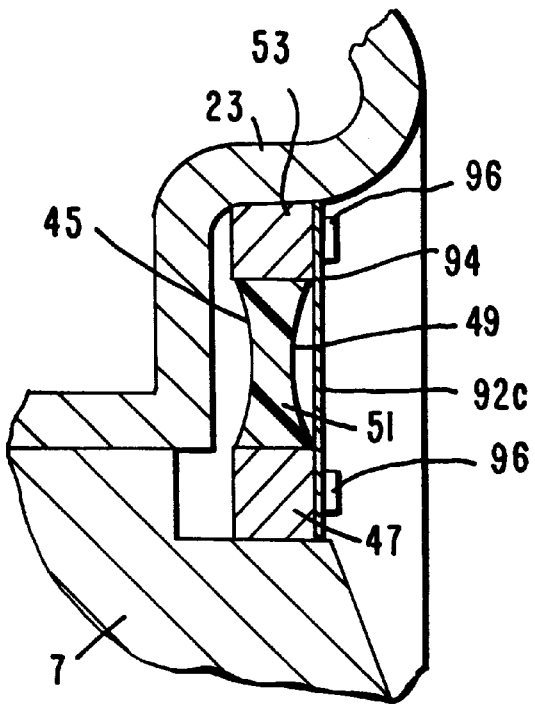
FIG. 10 is a modified embodiment of the bridge coupling of FIG. 2 having a spring steel disk associated with the elastomer.

FIG. 10 shows a different embodiment of the axially elastic element 49, in which, however, an elastomer 51 is again provided in the radial bearing 45, being attached by vulcanization with its radial outer side to the cover ring 53 of the radial bearing 45 and with its radial inner side to the bearing ring 47 of the radial bearing 45. Arranged axially next to the elastomer 51 is a spring steel disk 94, which is securely connected by riveting 96 both to the cover ring 53 and to the bearing ring 47 of the radial bearing 45 and which acts, together with the elastomer 51, as the torque transmission element 92c. The spring steel disk 94 has high dimensional stability in the circumferential direction, but low rigidity in the axial direction, and the latter rigidity acts parallel to that of the elastomer 51. Thanks to this parallel connection of the two rigidities, the elastomer 51 can be embodied especially axially flexible, and is therefore embodied with a smaller cross-section in its radial central area than at its radial ends, which must be wide enough to permit the vulcanization process. The similarly low axial rigidity of the spring steel disk 94 is preferably created by means of its small axial thickness, which can be less than 0.2 mm.

Radial bearing 45 functions such that the transmission of torques mainly occurs via the spring steel disk 94, while the elastomer 51, along with performing a sealing function, provides the desired elasticity in the axial direction.

Figure 11:
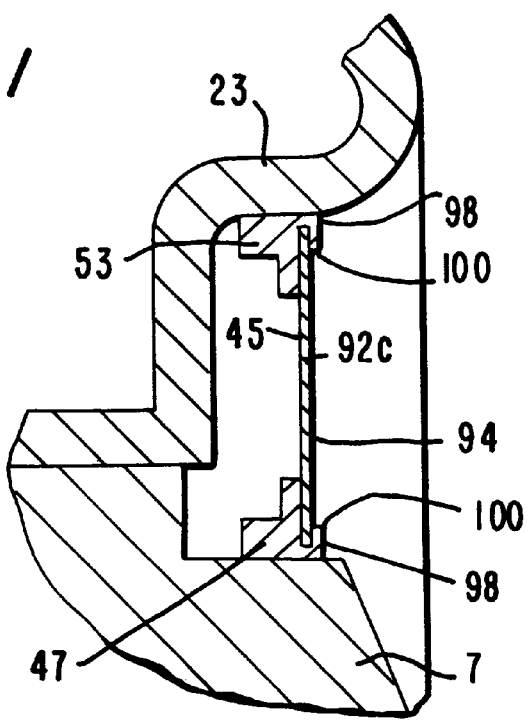
FIG. 11 is a further modified embodiment of the bridge coupling of FIG. 10 according to the invention.

FIG. 11 shows an embodiment in which the elastomer 51 is omitted and the torque transmission element 92c is formed by the spring steel disk 94 alone. The spring steel disk 94 is embodied somewhat more rigidly in the axial direction than in the embodiment in FIG. 10, because the axial rigidity of the elastomer 51 is no longer present. An axial extension 98 is provided on both the cover ring 53 and on the bearing ring 47 of the radial bearing 45. As soon as the spring steel disk 94 has come to rest on the cover ring 53 and the bearing ring 47, the axial extension 98 is deformed by radial flanging, and thus comes to rest on the side of the radial bearing 45 facing away from the cover ring 53 and the bearing ring 47. In this way, back gripping means 100 are created that can hold the spring steel disk 94 in a fluid-tight manner. As in the earlier drawings, in FIG. 11, for the sake of clarity, not every individual circumferential edge is shown.

The invention is not limited by the embodiments described above which are presented as examples only but can be modified in various ways within the scope of protection defined by tie appended patent claims.

We claim:

1. A bridge coupling in a hydrodynamic torque converter having an axially movable piston arranged on a radial bearing, wherein in one operating position the piston can be brought into active connection with a support surface of a drive side radial flange via at least one friction lining, the piston executing its axial movement under the influence of an axially elastic element, said bridge coupling comprising:

a torque transmission element forming part of the axially elastic element and being substantially deformable in an axial direction and dimensionally stable in a circumferential direction, said torque transmission element comprising an elastomer; and wherein the axially elastic element is integrally formed with the radial bearing.

2. The bridge coupling as claimed in claim 1, further comprising a vulcanized cover ring formed on said elastomer of the axially elastic element.

3. The bridge coupling as claimed in claim 1, further comprising an axial stop associated with the axially elastic element for limiting the axial movement of the piston in a direction of a converter circuit.

4. The bridge coupling as claimed in claim 3, wherein said axial stop is embodied on the radial bearing.

5. The bridge coupling as claimed in claim 1, wherein said elastomer comprises axial sides and a profiling on at least one of said axial sides for influencing a deformation behavior of said elastomer in the axial direction.

6. The bridge coupling as claimed in claim 1, wherein the radial bearing further comprises a bearing ring, said elastomer being supported by said bearing ring.

7. The bridge coupling as claimed in claim 6, wherein said bearing ring comprises a radial leg radially extending away from an axis of rotation, said radial leg forming an axial stop for the piston.

8. The bridge coupling as claimed in claim 7, wherein the piston further comprises a radial extension that extends radially inward relative to said elastomer and comes to rest on said axial stop.

9. The bridge coupling as claimed in claim 8, wherein the torque converter further comprises a housing hub having a radial support, and said radial extension further comprises an axial shoulder arranged on said radial support.

10. The bridge coupling as claimed in claim 8, wherein said radial extension further comprises a bracket attached to the piston in a radially inner region of the piston.

11. The bridge coupling as claimed in claim 1, wherein the piston further comprises a first tooth system and said radial bearing further comprises a second tooth system, said first and second tooth systems engaging each other in a toothed engagement, said elastomer having one end being axially secured to said radial bearing radially inside of said toothed engagement, and having an opposing end axially secured to the piston radially outside said toothed engagement.

12. The bridge coupling as claimed in claim 11, wherein said elastomer further comprises an axial recess in the radial extension area of said toothed engagement.

13. The bridge coupling as claimed in claim 11, wherein the piston comprises a partial segment integrally formed into said first tooth system such that said toothed engagement of said first toothed system is oriented substantially parallel to said second tooth system within an area of said partial segment.

14. The bridge coupling as claimed in claim 13, wherein said first and second tooth systems extend substantially radially.

15. The bridge coupling as claimed in claim 1, wherein said torque transmission element further comprises a spring steel disk arranged parallel to said elastomer.

16. The bridge coupling as claimed in claim 15, further comprising a vulcanized cover ring formed on said elastomer, and wherein the radial bearing further comprises a bearing ring, said elastomer being supported by said bearing ring; and wherein said spring steel disk is mounted in a rotation-proof manner to said cover ring and said bearing ring.

17. The bridge coupling as claimed in claim 16, wherein said spring steel disk is secured to said cover ring and said bearing ring by riveting.

18. A bridge coupling in a hydrodynamic torque converter having an axially movable piston arranged on a radial bearing, wherein in one operating position the piston can be brought into active connection with a support surface of a drive side radial flange via at least one friction lining, the piston executing its axial movement under the influence of an axially elastic element, said bridge coupling comprising:

a torque transmission element forming part of the axially elastic element and being substantially deformable in an axial direction and dimensionally stable in a circumferential direction, said torque transmission element comprising a spring steel disk; and a vulcanized cover ring formed on the piston, and wherein the radial bearing further comprises a bearing ring;

wherein the axially elastic element is integrally formed with the radial bearing and said spring steel disk is mounted in a rotation-proof fluid tight manner to said cover ring and said bearing ring.

19. The bridge coupling as claimed in claim 18, further comprising back-gripping means for mounting said spring steel disk to said cover ring and said bearing ring, said back gripping means comprising axial extensions on said cover ring and said bearing ring, said axial extensions being bent in the radial direction around said spring steel disk.

* * * * *